United States Patent
Dellock et al.

(10) Patent No.: US 9,751,458 B1
(45) Date of Patent: Sep. 5, 2017

(54) VEHICLE ILLUMINATION SYSTEM

(71) Applicant: Ford Global Technologies, LLC, Dearborn, MI (US)

(72) Inventors: Paul Kenneth Dellock, Northville, MI (US); Michael Musleh, Canton, MI (US); Stuart C. Salter, White Lake, MI (US); David Brian Glickman, Southfield, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/054,324

(22) Filed: Feb. 26, 2016

(51) Int. Cl.
*B60Q 1/26* (2006.01)

(52) U.S. Cl.
CPC ......... *B60Q 1/2619* (2013.01); *B60Q 1/2696* (2013.01); *B60Q 2900/30* (2013.01)

(58) Field of Classification Search
CPC .. B60Q 1/326; B60Q 1/2607; B60Q 2400/30; B60Q 1/323; B60Q 1/24; B60Q 1/302; B60Q 1/2619; B60Q 2400/40; B60Q 2900/30; H05B 37/02; H05B 33/0803
USPC ............... 362/231, 234, 485, 487, 510, 511; 315/149, 158, 294, 307, 312
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,119,068 A | 6/1992 | Nagai et al. |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,260,988 B1 | 7/2001 | Misawa et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,799,857 B2 * | 10/2004 | Martinson ............... B60R 1/006 359/850 |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |

(Continued)

FOREIGN PATENT DOCUMENTS

| | | |
|---|---|---|
| CN | 201102500 Y | 8/2008 |
| CN | 201169230 Y | 12/2008 |

(Continued)

*Primary Examiner* — Haissa Philogene
(74) *Attorney, Agent, or Firm* — Jason Rogers; Price Heneveld LLP (57) ABSTRACT

An illumination system for a vehicle is provided that includes a vehicle having a rear spoiler, a light assembly located on an underside of the spoiler, a sensor for sensing a location of a person proximate to the spoiler, and a controller for controlling the light assembly to illuminate an area proximate the rear of the vehicle when a person is detected proximate to the spoiler.

18 Claims, 7 Drawing Sheets

(56) References Cited

U.S. PATENT DOCUMENTS

| | | |
|---|---|---|
| 7,063,375 B2 | 6/2006 | Dringenberg et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,354,182 B2 * | 4/2008 | Bartels .................. B60Q 1/326 362/234 |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,589,622 B2 * | 9/2009 | Farley .................. B60Q 1/2615 340/463 |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,911,428 B2 * | 3/2011 | Gally .................. G02B 26/001 345/84 |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,113,695 B2 | 2/2012 | Meinke et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 * | 4/2013 | Kuhlman .............. B60Q 1/085 362/276 |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,321,395 B2 * | 4/2016 | Ammar ................ B60R 1/12 |
| 9,442,888 B2 | 9/2016 | Stanfield et al. |
| 9,499,090 B2 * | 11/2016 | Salter .................. B60Q 1/2607 |
| 9,604,568 B1 * | 3/2017 | Salter .................. B60Q 1/323 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0366036 A1 | 12/2015 | Luostarinen |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 101337492 A | 1/2009 |
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10129021 A1 | 9/2002 |
| DE | 10319396 A1 | 11/2004 |
| DE | 202005017408 U1 | 1/2006 |
| DE | 102005055702 A1 | 5/2007 |
| EP | 0719672 B1 | 12/1999 |
| EP | 1793261 A1 | 6/2007 |
| EP | 2719580 A1 | 4/2014 |
| EP | 2778209 A1 | 9/2014 |
| JP | 61160331 A | 7/1986 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |

* cited by examiner

VEHICLE ILLUMINATION SYSTEM

FIELD OF THE INVENTION

The present disclosure generally relates to vehicle lighting systems, and more particularly, to vehicle lighting systems employing sensing structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present disclosure, an illumination system for a vehicle is provided that includes a vehicle having a rear spoiler, a light assembly located on the spoiler, a sensor for sensing a location of a person near the spoiler, and a controller for controlling the light assembly to illuminate an area proximate the rear of the vehicle when a person is detected proximate to the spoiler.

According to another aspect of the present disclosure, an illumination system for a vehicle is provided that includes a vehicle having a body feature, a light assembly positioned on the body feature, and one or more wireless communication transceivers for detecting an electronic device proximate the body feature. The wireless communication transceivers are disposed within the light assembly.

According to yet another aspect of the present disclosure, a method of illuminating a vehicle is provided that includes arranging a light assembly on a body feature of the vehicle, detecting an electronic device proximate the light assembly, and activating the light assembly to emit light based on a detected location of the electronic device.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination system for a vehicle configured to illuminate a portion of the vehicle as well as a surface beneath or behind a vehicle. In some embodiments, a light source may be utilized to illuminate both the surface beneath the vehicle and the vehicle. The light source may be configured to emit light at a first wavelength or primary emission to excite a photoluminescent structure. The photoluminescent structure may be disposed on a body feature of the vehicle and be configured to convert the first wavelength of the light or the primary emission into a second wavelength or secondary emission. The first wavelength of the light may correspond to a first color of light and the second wavelength may correspond to a second color of light, different from the first color. While the various embodiments of the illumination system described herein refer to specific structures demonstrated in reference to at least one automotive vehicle, it will be appreciated that the vehicle illumination system may be utilized in a variety of applications.

Figure 1:
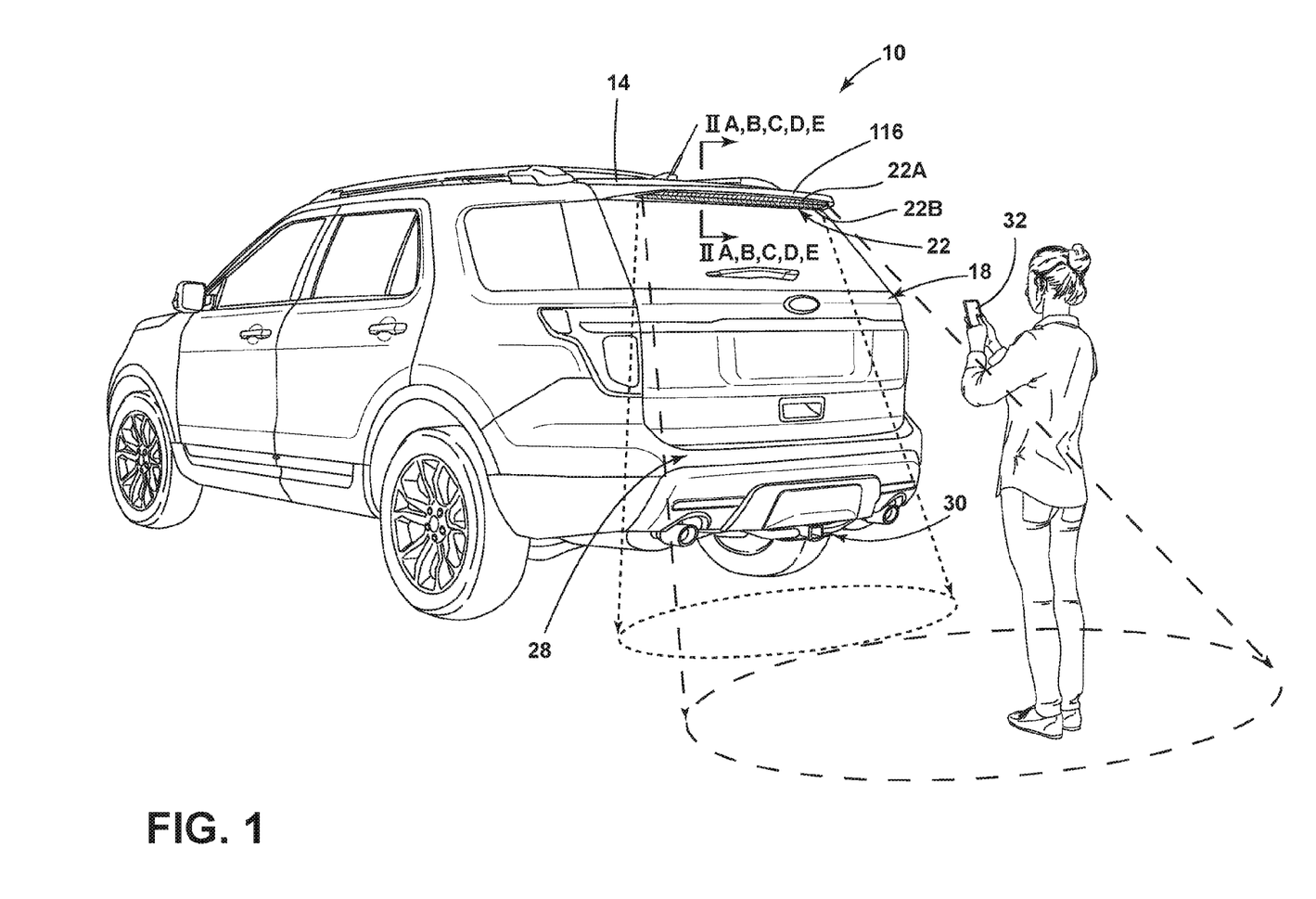
FIG. 1 is a rear perspective view of a vehicle equipped with an illumination system, according to one embodiment.
Figure 3:
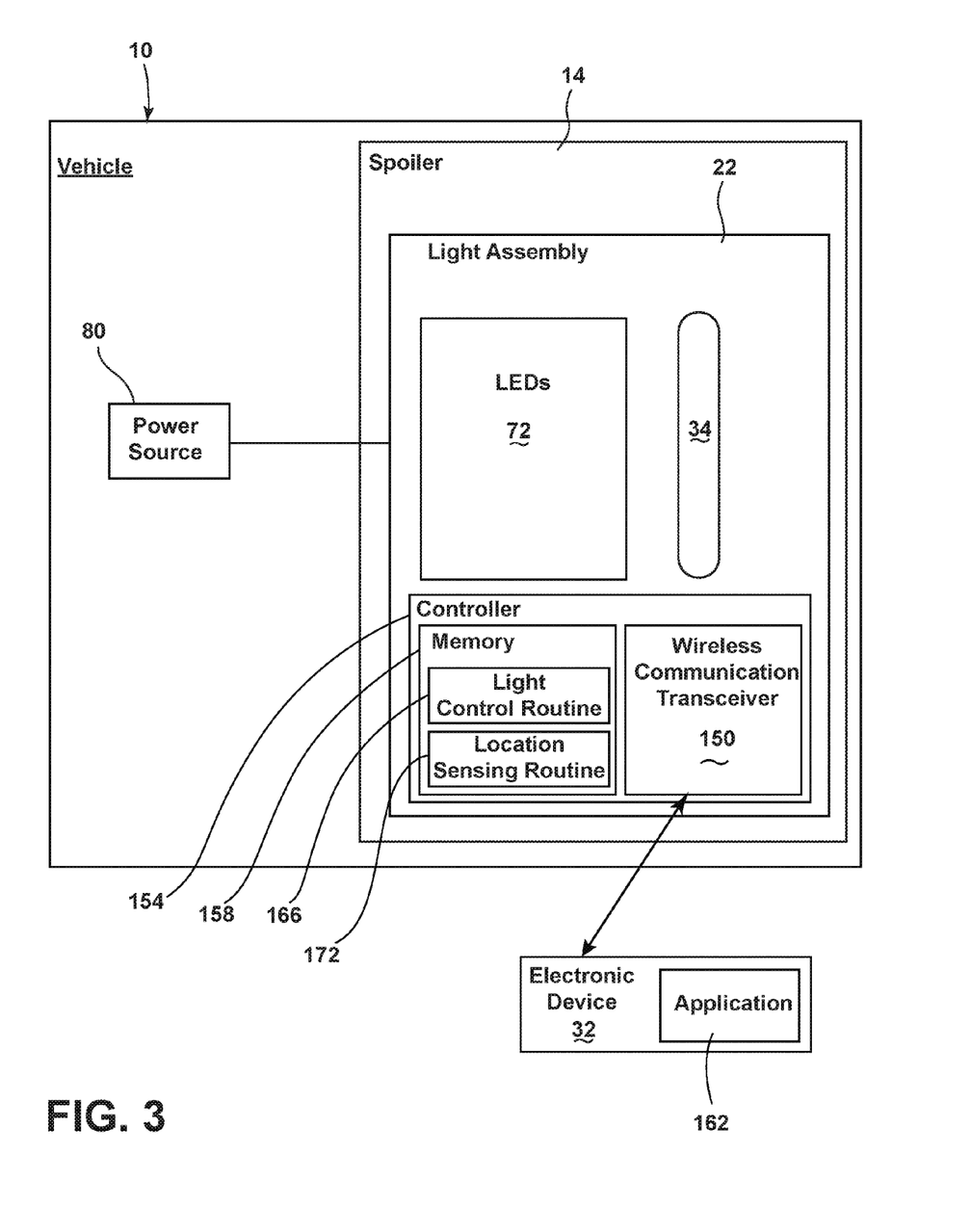
FIG. 3 is a block diagram of the vehicle and the lighting system.

Referring to FIG. 1, reference numeral 10 generally shows a vehicle 10 depicted as a cross-over or sport utility vehicle. The vehicle 10 is shown having a plurality of body features including a spoiler 14 disposed on (or optionally above) a lift gate 18 of the vehicle 10 such that the spoiler 14 is located near the top rear edge of the body of the vehicle 10. The lift gate 18 is configured to rotate between substantially open and closed positions such that a person may store and access an internal storage and/or cargo space. The spoiler 14 is equipped with a light assembly 22 that is configured to illuminate a rear portion of the vehicle 10 and at least a portion of a surface located beneath and generally rearward of the vehicle 10 (e.g., the ground, road, parking deck). In various embodiments, the light assembly 22 may be divided into two elongate portions 22A, 22B. The rear of the vehicle 10 generally includes a bumper 28 and a trailer hitch 30 generally located below the spoiler 14 near a bottom rear edge of the body of the vehicle 10. The elongate portions 22A, 22B of the light assembly 22 may include one or more light sources and one or more optics such that the light assembly 22 may direct and move light as well as vary an intensity of the light emitted. In various embodiments, the light assembly 22 is configured to detect an electronic device 32 (FIG. 3). The electronic device 32 may include a cellphone, a key FOB, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic). As discussed in greater detail below, the light assembly 22 may alter the direction of light emitted or the intensity of the light based on movement and or the detected location of the electronic device 32.

Figure 2A:
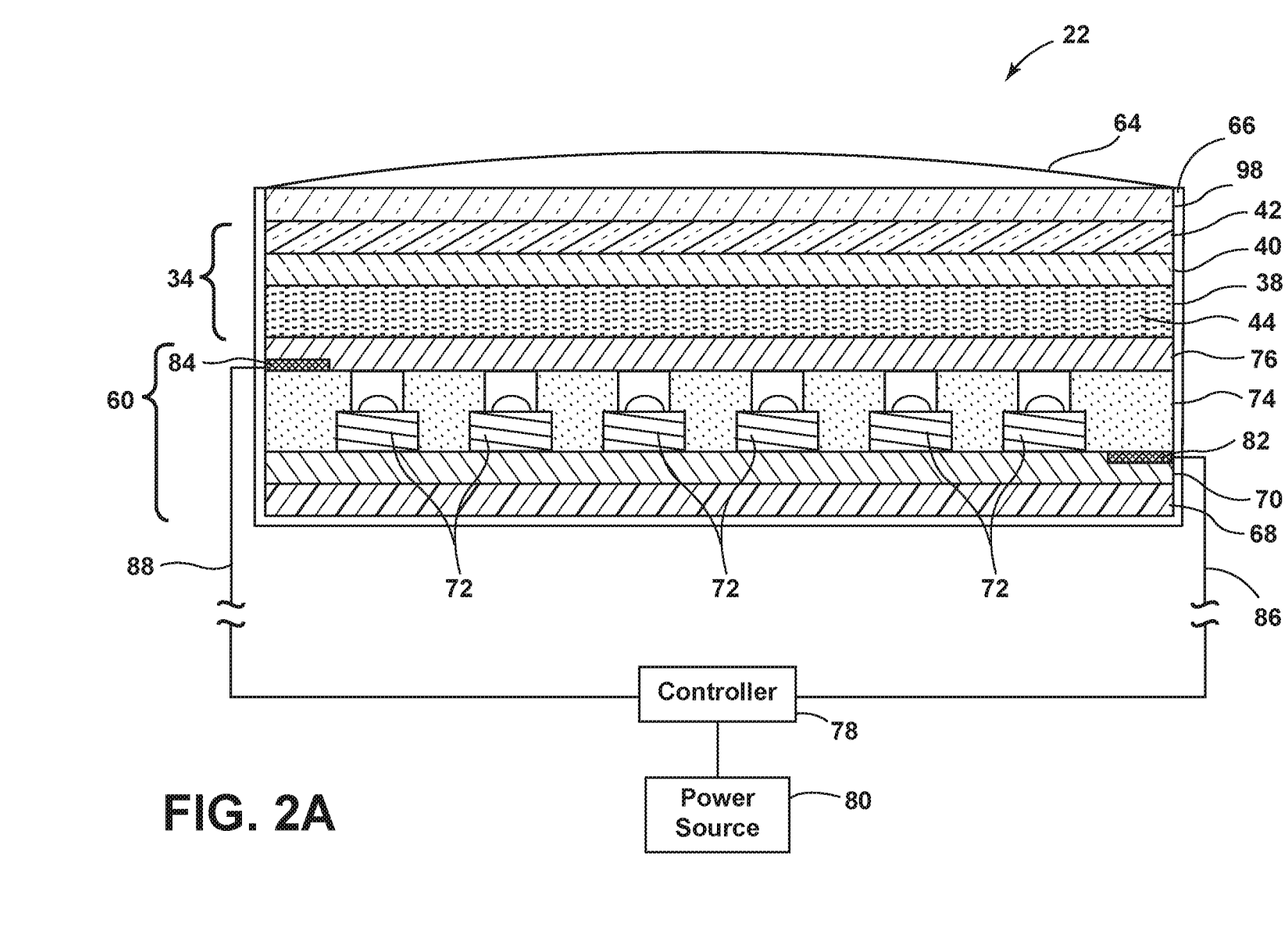
FIG. 2A is a cross-sectional view taken along line II-II of FIG. 1 illustrating a light assembly according to one embodiment.

Referring to FIGS. 2A-2E, a cross-sectional view of the light assembly 22 capable of use on the vehicle 10 of FIG. 1 with an external photoluminescent structure 34 is shown, according to various embodiments. As illustrated in FIG. 2A, the light assembly 22 may have a stacked arrangement that includes a light-producing assembly 60, the photoluminescent structure 34, a viewable portion 64, and an overmold material 66. It will be understood that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle substrate 68 on which the light assembly 22 is to be received (e.g., the body feature or spoiler 14 of FIG. 1). Alternatively, as a cost saving measure, the substrate 68 may directly correspond to a preexisting structure (e.g., a portion of the body feature or spoiler 14).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84, may also be placed in any orientation such that the light-producing assembly 60 may emit outputted light 102 (FIG. 2B) towards a desired location.

The LED sources 72 may be dispersed in a random or controlled fashion within the semiconductor ink 74 and may be configured to emit focused or non-focused light toward the photoluminescent structure 34. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring still to FIG. 2A, the photoluminescent structure 34 is arranged over the negative electrode 76 as a coating, layer, film or other suitable deposition. With respect to the presently illustrated embodiment, the photoluminescent structure 34 may be arranged as a multi-layered structure including an energy conversion layer 38, optional stability layer 40, and optional protective layer 42, as described above.

The viewable portion 64 is arranged over the photoluminescent structure 34. In some embodiments, the viewable portion 64 may include a plastic, silicon, or urethane material and is molded over the photoluminescent structure 34 and light-producing assembly 60. Preferably, the viewable portion 64 should be at least partially light transmissible. In this manner, the viewable portion 64 will be illuminated by the photoluminescent structure 34 whenever an energy conversion process is underway. Additionally, by over-sealing the viewable portion 64, it may also function to protect the photoluminescent structure 34 and the light-producing assembly 60. The viewable portion 64 may be arranged in a planar shape and/or an arcuate shape to enhance its viewing potential. Like the photoluminescent structure 34 and the light-producing assembly 60, the viewable portion 64 may also benefit from a thin design, thereby helping to fit the light assembly 22 into small package spaces of the vehicle 10.

In some embodiments, a decorative layer 98 may be disposed between the viewable portion 64 and the photoluminescent structure 34. The decorative layer 98 may include a polymeric material or other suitable material and is configured to control or modify an appearance of the viewable portion 64 of the light assembly 22. For example, the decorative layer 98 may be configured to confer an appearance of a trim component (e.g., metallic) on the vehicle 10 (FIG. 1) to the viewable portion 64 when the viewable portion 64 is in an unilluminated state. In other embodiments, the decorative layer 98 may be tinted any color to complement the spoiler 14 of the vehicle 10 in FIG. 1. In any event, the decorative layer 98 should be at least partially light transmissible such that the photoluminescent structure 34 is not prevented from illuminating the viewable portion 64 whenever an energy conversion process is underway.

The overmold material 66 is disposed around the light-producing assembly 60 and/or photoluminescent structure 34. The overmold material 66 may protect the light-producing assembly 60 from physical and chemical damage arising from environmental exposure. The overmold material 66 may have viscoelasticity (i.e., having both viscosity and elasticity), a low Young's modulus, and/or a high failure strain compared with other materials, so that the overmold material 66 may protect the light-producing assembly 60 when contact is made thereto. For example, the overmold material 66 may protect the light-producing assembly 60 from the environmental containments, such as dirt and water, that may come in contact with the spoiler 14 of the vehicle 10. It is also contemplated that the viewable portion 64 may be formed by a portion of the overmold material 66. According to one embodiment, the overmold material 66 may be the portion of the spoiler 14 that surrounds the light-producing assembly 60.

In some embodiments, the photoluminescent structure 34 may be employed separate and away from the light-producing assembly 60. For example, the photoluminescent structure 34 may be positioned on the lift gate 18 (FIG. 1), another location of the spoiler 14 (FIG. 1), a roof of the vehicle 10 (FIG. 1) and/or any surface proximate, but not in physical contact with, the light-producing assembly 60. It should be understood that in embodiments where the photoluminescent structure 34 is incorporated into distinct components separated from the light assembly 22, the light assembly 22 might still have the same or similar structure to the light assembly 22 described in reference to FIG. 2A.

Figure 2B:
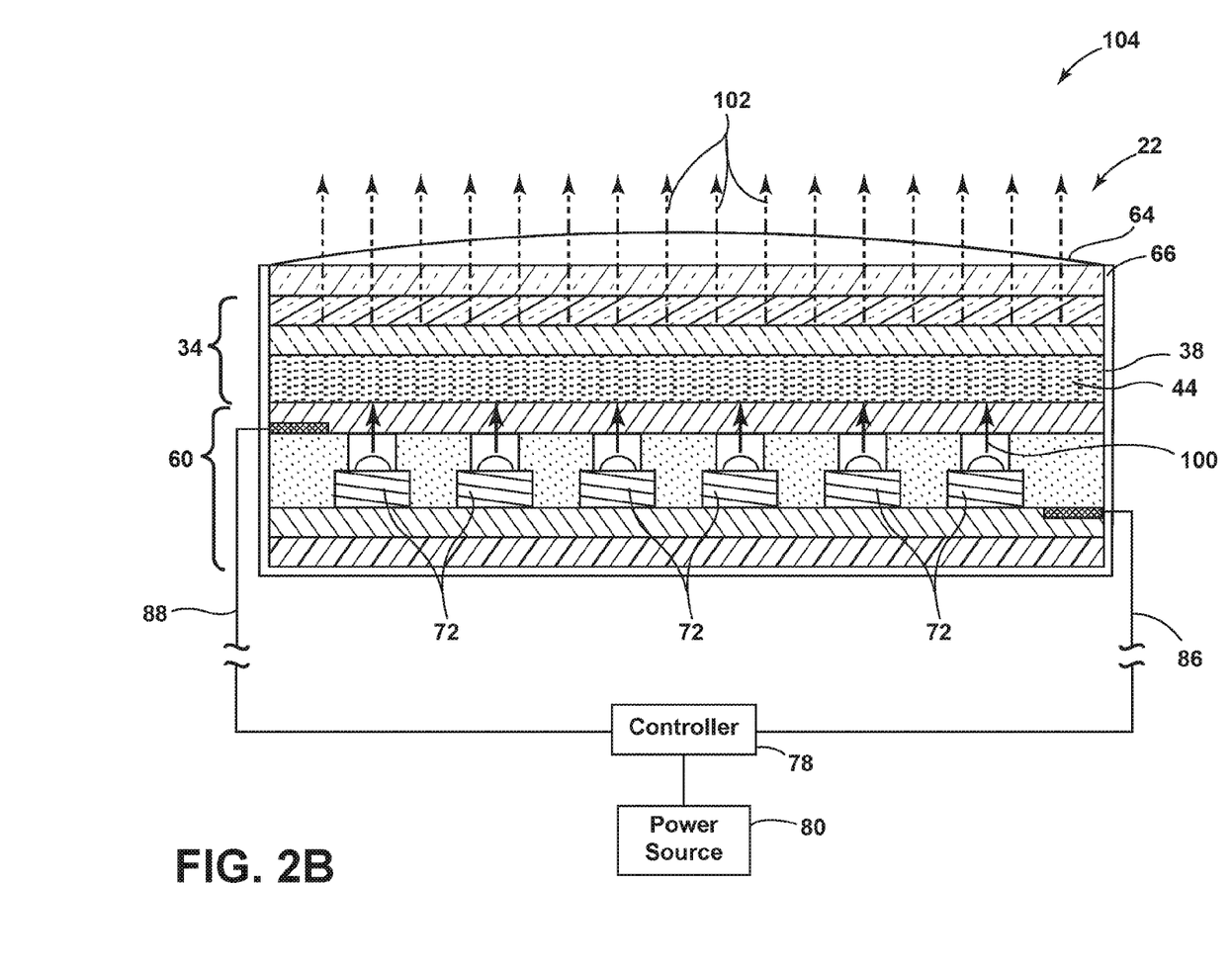
FIG. 2B is a cross-sectional view taken along line II-II of FIG. 1 further illustrating the light assembly, according to one embodiment.

Referring to FIG. 2B, an energy conversion process 104 for producing single color luminescence is illustrated, according to one embodiment. For purposes of illustration, the energy conversion process 104 is described below using the light assembly 22 depicted in FIG. 2A. In this embodiment, the energy conversion layer 38 of the photoluminescent structure 34 includes a single photoluminescent material 44, which is configured to convert inputted light 100 received from LED sources 72 into an outputted light 102 having a wavelength different than that associated with the inputted light 100. More specifically, the photoluminescent material 44 is formulated to have an absorption spectrum that includes the emission wavelength of the inputted light 100 supplied from the LED sources 72. The photoluminescent material 44 is also formulated to have a Stokes shift resulting in the converted visible light 102 having an emission spectrum expressed in a desired color, which may vary per lighting application. The converted visible light 102 is outputted from the light assembly 22 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Figure 2C:
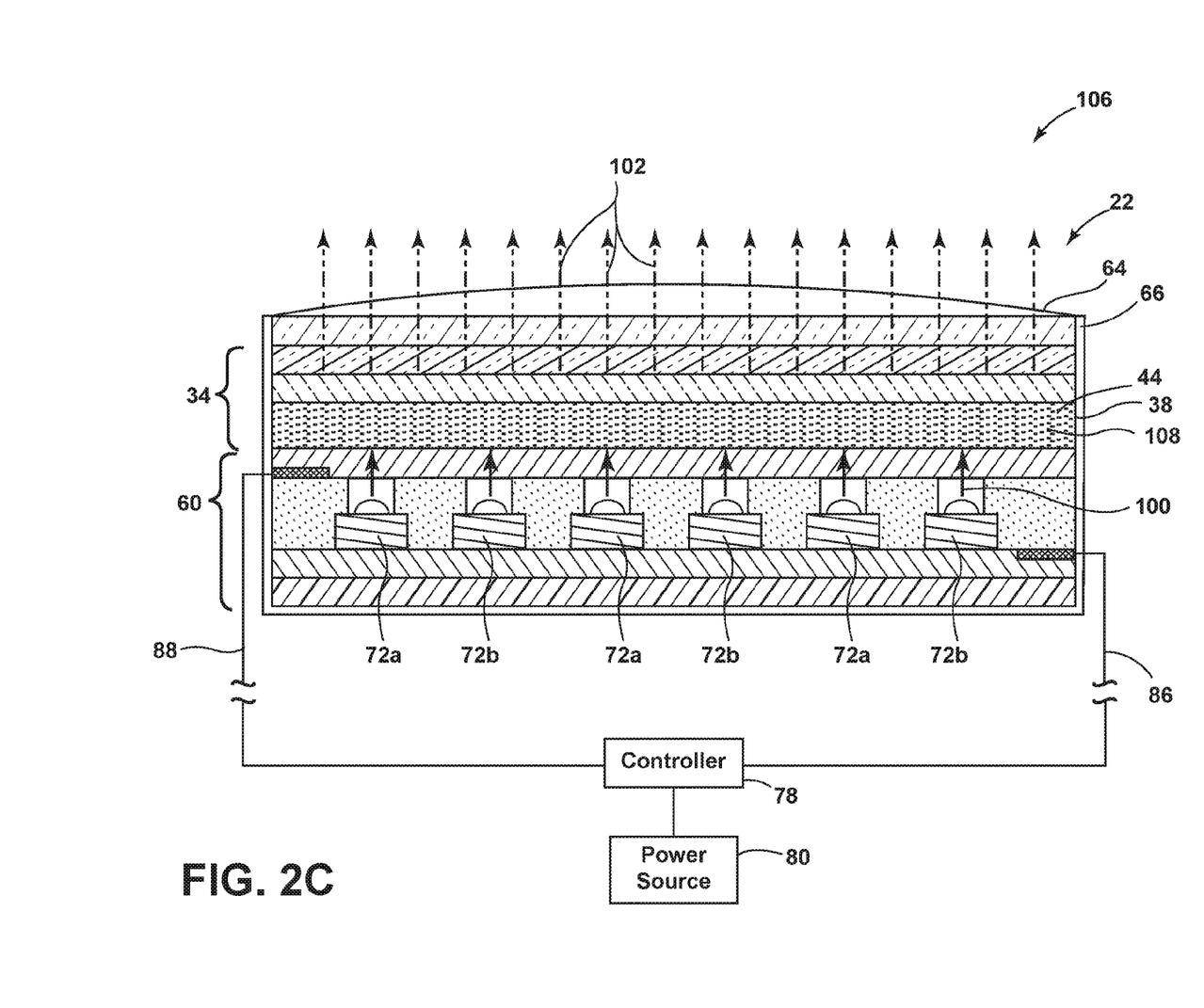
FIG. 2C is a cross-sectional view taken along line II-II of FIG. 1 illustrating an alternate light assembly, according to one embodiment.

Referring to FIG. 2C, a second energy conversion process 106 for generating multiple colors of light is illustrated, according to one embodiment. For consistency, the second energy conversion process 106 is also described below using the light assembly 22 depicted in FIG. 2A. In this embodiment, the energy conversion layer 38 includes the first and second photoluminescent materials 44, 108 that are interspersed within the energy conversion layer 38. Alternatively, the photoluminescent materials 44, 108 may be isolated from each other, if desired. Also, it should be appreciated that the energy conversion layer 38 may include more than two different photoluminescent materials 44 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 44, 108 is mutually exclusive. That is, photoluminescent materials 44, 108 are formulated to have non-overlapping absorption spectrums and Stoke shifts that yield different emission spectrums. Also, in formulating the photoluminescent materials 44, 108, care should be taken in choosing the associated Stoke shifts such that the converted light 102 emitted from one of the photoluminescent materials 44, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 44 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 34 to luminesce in a variety of colors. For example, the controller 78 may activate only LED sources 72a to exclusively excite photoluminescent material 44, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 44, 108 to become excited, resulting in the viewable portion 64 illuminating in a third color, which is a color mixture of the first and second colors (e.g., pinkish). The intensities of the inputted light 100 emitted from each light assembly 22 may also be proportionally varied to one another such that additional colors may be obtained. For energy conversion layers 38 containing more than two distinct photoluminescent materials 44, a greater diversity of colors may be achieved. Contemplated colors include red, green, blue, and combinations thereof, including white, all of which may be achieved by selecting the appropriate photoluminescent materials 44 and correctly manipulating the corresponding LED sources 72.

Figure 2D:
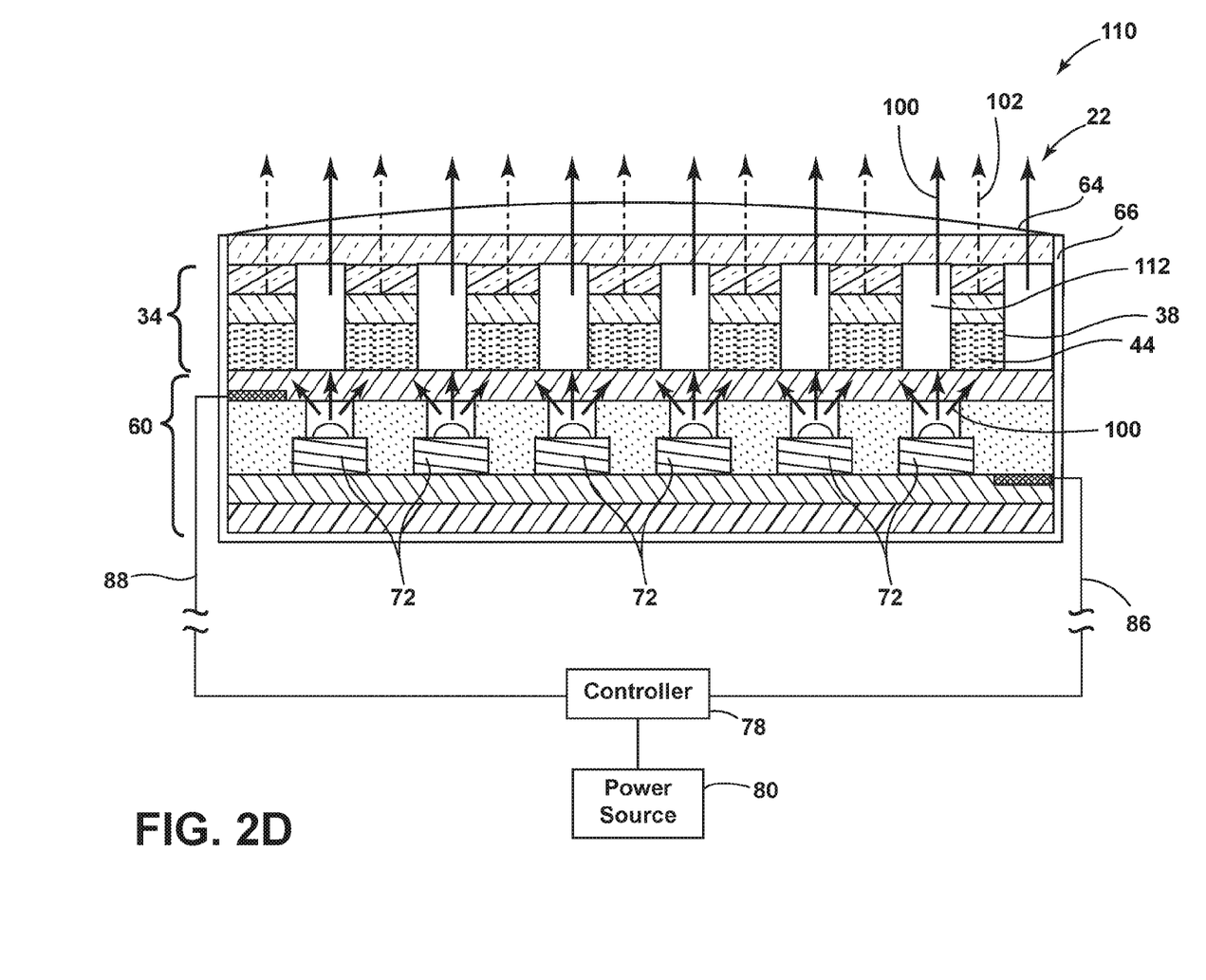
FIG. 2D is a cross-sectional view taken along line II-II of FIG. 1 illustrating a light assembly having a luminescent structure separated by light transmissive portions disposed on the light source, according to another embodiment.

Referring to FIG. 2D, a third energy conversion process 110 includes a light-producing assembly 60, such as the one described in reference to FIG. 2A, and a photoluminescent structure 34 disposed thereon, according to an alternate embodiment. The photoluminescent structure 34 is configured to convert inputted light 100 received from LED sources 72 into a visible light 102 having a wavelength different than that associated with the inputted light 100. More specifically, the photoluminescent structure 34 is formulated to have an absorption spectrum that includes the emission wavelength of the inputted light 100 supplied from the LED sources 72. The photoluminescent material 44 is also formulated to have a Stokes shift resulting in the converted visible light 102 having an emission spectrum expressed in a desired color, which may vary per lighting application.

The photoluminescent structure 34 may be applied to a portion of the light-producing assembly 60, for example, in a stripped manner. Between the photoluminescent structures 34 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 34 disposed proximate to the light-producing assembly 60. The second photoluminescent structure 34 may be configured to luminesce in response to the inputted light 100 that is directed through the light transmissive portions 112.

Figure 2E:
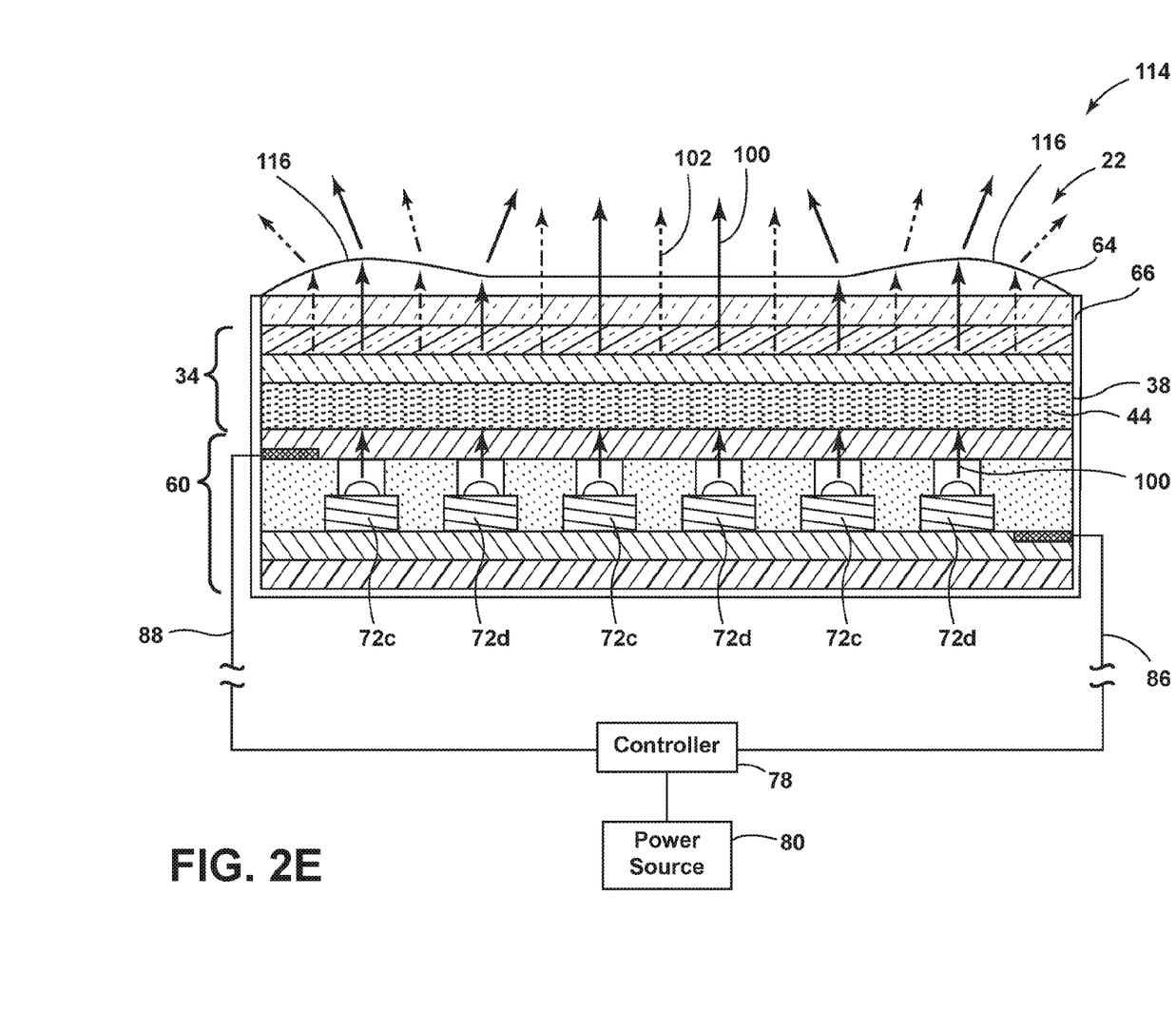
FIG. 2E is a cross-sectional view taken along line II-II of FIG. 1 illustrating an alternate light source having a luminescent structure disposed on the light source configured to convert a portion of light emitted from the light source from a first wavelength to a second wavelength, according to one embodiment.

Referring to FIG. 2E, a fourth energy conversion process 114 for generating multiple colors of light utilizing the light-producing assembly 60, such as the one described in reference to FIG. 2A, and a photoluminescent structure 34 disposed thereon is illustrated. In this embodiment, the photoluminescent structure 34 is disposed over a top portion of the light-producing assembly 60. The excitation of photoluminescent material 44 is formulated such that a portion of inputted light 100 emitted from LED sources 72c, 72d passes through the photoluminescent structure 34 at the first wavelength (i.e., the inputted light 100 emitted from the light assembly 22 is not converted by the photoluminescent structure 34). The intensity of the emitted light (i.e., the combination of the inputted light 100 and outputted light 102) may be modified by pulse-width modulation or current control to vary the amount of inputted light 100 emitted from the LED sources 72c, 72d that pass through the photoluminescent structure 34 without converting to a second, outputted 102 wavelength. For example, if the light assembly 22 is configured to emit light 100 at a low level, substantially, all of the light 100 may be converted to outputted light 102. In this configuration, a color of light 102 corresponding to the photoluminescent structure 34 may be emitted from the light-producing assembly 60. If the light assembly 22 is configured to emit inputted light 100 at a high level, only a portion of the first wavelength may be converted by the photoluminescent structure 34. In this configuration, a first portion of the emitted light may be converted by the photoluminescent structure 34 and a second portion of the emitted light may be emitted from the light-producing assembly 60 at the first wavelength towards additional photoluminescent structures disposed proximately to the light assembly 22. The additional photoluminescent structures may luminesce in response to the light 100 emitted from the light assembly 22.

According to one exemplary embodiment, a first portion of the LED sources 72, exemplarily shown as LED sources 72c, is configured to emit an inputted light 100 having a wavelength that excites the photoluminescent material 44 within the photoluminescent structure 34 and results in the inputted light 100 being converted into a visible light 102 of a first color (e.g., white). Likewise, a second portion of the LED sources 72, exemplarily shown as LED sources 72d, are configured to emit an inputted light 100 having a wavelength that passes through the photoluminescent structure 34 and excites additional photoluminescent structures disposed proximately to the spoiler 14 or lift gate 18, thereby illuminating in a second color. The first and second colors may be visually distinguishable from one another. In this manner, LED sources 72c and 72d may be selectively activated using the controller 78 to cause the spoiler 14 to luminesce in a variety of colors.

The light-producing assembly 60 may also include optics 116 that are configured to direct light 100 emitted from the LED sources 72c, 72d and the light 102 emitted from the photoluminescent structure 34 towards pre-defined locations. For example, emitted light 102 from the LED sources 72c, 72d and the photoluminescent structure 34 may be directed and/or focused towards a desired feature and/or location proximate to the light assembly 22. In other embodiments, the focused emitted light 102 may be directed and focused to different distances behind the vehicle 10 (FIG. 1).

Referring to FIG. 3, a block diagram of the vehicle 10 is shown in which the light assembly 22 is positioned on the spoiler 14. As explained above, the power source 80 is connected to the light assembly 22 to provide power to the LEDs 72 within the light assembly 22. The light assembly 22, and vehicle 10, is also equipped with one or more sensors for detecting if the person and electronic device 32 are near. The sensors may include wireless communication transceivers 150. The light assembly 22 may include one or more of the wireless communication transceivers 150 and be configured to interact with the electronic device 32. The wireless communication transceivers 150 may communicate with the electronic device 32 over a wireless signal (e.g., radio frequency). In a specific example, the wireless communication transceivers 150 may be a Bluetooth™ RN4020 module, or an RN4020 Bluetooth™ low energy PICtail board configured to communicate with the electronic device 32 using Bluetooth™ low energy signals. The wireless communication transceivers 150 may include a transmitter and a receiver to transmit and receive wireless signals (e.g., Bluetooth™ signals) to and from the electronic device 32. It will be appreciated that the wireless communication transceivers 150 may utilize other forms of wireless communication between with the electronic device 32 and other wireless communication transceivers 150 such as Wi-Fi™. The wireless communication transceivers 150 may be positioned on or within a controller 154. The controller 154 may be a dedicated controller 154 or may be a shared controller 154 (e.g., for multiple light assemblies or light assemblies for other body features). The controller 154 may include a processor and a memory 158 for executing stored routines or for storing information (e.g., related to the operation of the light assembly 22 and/or the electronic device 32). The wireless communication transceiver 150 is configured to communicate with the microprocessor such that one or more of the routines stored in the memory 158 is activated. The electronic device 32 may include one or more routines which control the communication between the wireless communication transceiver 150 and the electronic device 32. For example, in mobile smart phone embodiments of the electronic device 32, the phone may include one or more applications 162 configured to communicate with the wireless communication transceivers 150. In the depicted embodiment, the memory 158 of the controller 154 includes a light control routine 166 and a location sensing routine 172. In various embodiments, the wireless communication transceivers 150 is a standalone device that is not in communication with body control modules, electronic control modules, engine control modules and/or other features of the vehicle 10. For example, the wireless communication transceivers 150 may only be capable of communication with the light assembly 22 and the electronic device 32. In other embodiments, the wireless communication transceivers 150 may communicate with the body controller or other onboard controllers.

The vehicle 10 may include a plurality of wireless communication transceivers 150, similar to that described in connection with the light assembly 22, positioned around the vehicle 10 (e.g., a rear, sides, or front of the vehicle 10). The wireless communication transceivers 150 may be in communication with one another or may mutually communicate with a master controller or module (e.g., body control module). The wireless communication transceivers 150 may be disposed within other accessories of the vehicle 10, or may be stand alone units. The electronic device 32 may communicate with all, some, or none of the wireless communication transceivers 150 as the electronic device 32 enters and exits the communication range of the transceivers 150. Each of the wireless communication transceivers 150 may be aware of its location within the vehicle 10 and capable of sharing its location with the electronic device 32. In various embodiments, the wireless communication transceivers 150 are capable of communicating with the electronic device 32 such that the location of the electronic device 32 may be determined therefrom (e.g., based on signal strength and/or return time of the signal) or vice versa. According to one embodiment, the location sensing routine 172 in the memory 158 of the controller 1154 may utilize the signal strength and time to return of the signals between the wireless communication transceivers 150 and the electronic device 32 to triangulate the position of the electronic device 32 as the person moves around and inside of the vehicle 10. In embodiments where the wireless communication transceivers 150 communicate with a master module, the location of the electronic device 32 may be calculated in the master module. The location of the electronic device 32 may have sufficient resolution to determine which seat within the vehicle 10 the user is approaching or sitting in. The electronic device 32 may then share its determined location with the wireless communication transceivers 150 such that appropriate features (e.g., approach lighting) may be activated by the appropriate transceivers 150. It will be understood that the location sensing routine 172 may be located on the electronic device 32 and that any location determinations may be made by the electronic device 32 and shared with the wireless communication transceivers 150 without departing from the spirit of this disclosure.

The light control routine 166 may process signals from the wireless communication transceiver 150 (e.g., the location of the electronic device 32) to activate the light assembly 22. Depending on the signals received from the wireless communication transceiver 150, the light control routine 166 may be activated. The light control routine 166 may store a predetermined pattern of illumination for the light assembly 22 based on detected properties of the electronic device 32 (e.g., known or unknown device, location, and user specific data). For example, the light control routine 166 may control the light assembly 22 to follow the electronic device 32 by activating the first or second elongate portions 22A, 22B. The electronic device 32 may store user specific data and preferences relating to the lighting assembly (e.g., color, intensity, pattern, activation distance, etc.) and/or the memory 158 (e.g., the light control routine 166) may store this data.

Choosing which electronic devices 32 should be trusted, and, therefore, given access to command of the controller 154 the wireless communication transceiver 150 is located in (e.g., the light assembly 22), may be determined based on whether the electronic device 32 has been inside of the vehicle 10 before. The memory of the wireless communication transceivers 150 may store identifying information relating to electronic devices 32 which were detected within the vehicle 10 (e.g., using the location sensing routine 172) and which may therefore be generally regarded as "friendly" and/or as the owner of the vehicle 10. In an exemplary method of determining that an unknown electronic device 32 is friendly, the wireless communication transceivers 150 detect the presence of an unknown electronic device 32, detect a characteristic signal shift (e.g., attenuation or increase in signal at corresponding wireless communication transceivers 150) indicative of the unknown electronic device 32 entering or being within the vehicle 10 across multiple wireless communication transceivers 150, and store characteristic information about the electronic device 32 for future identification. It will be understood that a determination of the location of the electronic device 32 to be within the vehicle 10 may also prompt a storing of the characteristic information about the electronic device 32 for future identification. Utilizing the past and/or present location of the electronic device 32 as a security feature to determine if it is allowed access to the controller 154 may be particularly advantageous as the replication of signal shifting indicative of the electronic device 32 entering the vehicle 10 and the location of the electronic device 32 is particularly difficult to fake. Further, it will be understood that more conventional methods of connecting electronic devices 32, such as pairing and manually connecting, may also be utilized to designate friendly devices 32.

Detection and location of the electronic devices 32 by the wireless communication transceivers 150 may allow for a variety of lighting controls to be affected. For example, if a known or friendly electronic device 32 is detected near (e.g., within about 2 m) the rear of the vehicle 10 for a predetermined amount of time (e.g., greater than about 5 seconds), the intensity of the light emitted from the light assembly 22 may be increased (e.g., by overdriving the light assembly 22). Increasing intensity of the light may aid the person in possession of the electronic device 32 in operating the trailer hitch 30 (FIG. 1), or aid in the loading or unloading of cargo from the vehicle 10. Additionally, detection of the distance of the electronic device 32 from the spoiler 14 may allow for the light assembly 22 to change where light is projected to using the optics 116 (FIG. 2E) and/or by altering which of the elongate portions 22A, 22B (FIG. 1) is activated. For example, as the electronic device 32 is detected moving away or toward the vehicle 10, the optics 116 may adjust the direction of the light from the light assembly 22 to follow the electronic device 32. In embodiments where the light assembly 22 is divided into the elongate portions 22A, 22B, each of the elongate portions 22A, 22B may have separate optics (e.g., optics 116) such that independent activation of the elongate portions 22A, 22B may change the direction or throw of the light.

Detection of location of the electronic device 32 relative to the vehicle 10 also permits the wireless communication transceivers 150 to determine if an unrecognized electronic device 32 is proximate the vehicle 10. Such an unrecognized electronic device 32 may be owned or carried by a potential burglar or threat to the vehicle 10. In events where an unrecognized electronic device 32 is detected proximate the vehicle 10 for greater than a predetermined time, the wireless communication transceivers 150 may activate one or more counter measures. Countermeasures may include a strobe light from the light assembly 22 or directing light from the assembly 22 at the electronic device 32. In some embodiments, any available identifying information about the electronic device 32 may be stored for later retrieval if the owner of the vehicle's electronic device 32 is not detected proximate the vehicle 10 at the same time. The wireless communication transceivers 150 may store greater than fifty electronic devices 32 that may have been a threat. Finally, the use of the light assembly 22 on the spoiler 14 of the vehicle 10 may allow for a plurality of lighting solutions to be provided for the reversing or backing up of the vehicle 10. For example, the shifting of the vehicle 10 into a reverse gear may cause activation of the light assembly 22 to provide greater illumination for the driver or for a backup camera of the vehicle 10.

A variety of advantages may be derived from the use of the present disclosure. For example, use of the disclosed light assembly 22 may allow for very consistent lighting of the rear of the vehicle 10 (e.g., to drape light across the rear vehicle 10 in a wash light manner) and the ground without hot spots. The even lighting may be accomplished by the use of thousands of the LEDs 72. Additionally, use of the optics 116, and/or the elongate portions 22a, 22b of the light assembly 22, may allow for light from the light assembly 22 not only to cover a large area of ground (e.g., greater than about 3 m wide and about 10 m deep), but, additionally, may allow for the movement of light from one area on the ground to another (e.g., from an area proximate the trailer hitch 30 to a distance further behind the vehicle 10). Further, use of the wireless communication transceivers 150 allows for the light assembly 22 to be activated as a person approaches. Further, due to the low package space requirements of the light assembly 22, the light assembly 22 may be adhesively bonded within a depression on the spoiler 14. Finally, use of the wireless communication transceivers 150 allows for a low consumption of power from the vehicle 10 while the driver or passengers are away from the vehicle 10.

For the purposes of describing and defining the present teachings, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. An illumination system for a vehicle, comprising:
a vehicle having a rear spoiler;
a light assembly located on the spoiler;
a sensor for sensing a location of a person near the spoiler; and
a controller for controlling the light assembly to illuminate an area proximate the rear of the vehicle when the person is detected proximate to the spoiler, wherein the light assembly illuminates a trailer hitch proximate a rear of the vehicle.

2. The illumination system of claim 1, wherein the sensor comprises one or more wireless communication transceivers for detecting an electronic device in the possession of the person and determining a location of the electronic device.

3. The illumination system of claim 2, wherein a controller associated with the wireless communication transceiver is configured to store information about the electronic device.

4. The illumination system of claim 1, wherein the light assembly illuminates a ground below the vehicle.

5. The illumination system of claim 1, further comprising:
at least one photoluminescent structure disposed on the spoiler.

6. The illumination system of claim 1, wherein the controller is configured to increase an intensity of the light assembly after the person is detected proximate the spoiler for a predetermined amount of time.

7. The illumination system of claim 1, wherein the light assembly is configured to illuminate different areas based on the location of the person.

8. An illumination system for a vehicle, comprising:
a vehicle having a body feature;
a light assembly positioned on the body feature; and
one or more wireless communication transceivers disposed within the light assembly for detecting an electronic device proximate the body feature, wherein the one or more wireless communication transceivers cooperate with other wireless communication transceivers on the vehicle to detect a location of the electronic device.

9. The illumination system of claim 8, wherein the one or more wireless communication transceivers are standalone from other vehicle modules.

10. The illumination system of claim 8, further comprising:
a photoluminescent structure disposed on the body proximate the light assembly.

11. The illumination system of claim 10, wherein the light assembly is configured to emit light at a first wavelength and the photoluminescent structure is configured to convert the first wavelength to at least a second wavelength longer than the first wavelength.

12. The illumination system of claim 8, wherein the one or more wireless communication transceivers control activation of the light assembly.

13. A method of illuminating a vehicle comprising:
arranging a light assembly on a body feature of the vehicle;
detecting an electronic device proximate the light assembly; and
activating the light assembly to emit light based on a detected location of the electronic device.

14. The method of claim 13, further comprising the step:
altering an intensity of the light assembly after the electronic device is detected proximate the vehicle for a predetermined period of time.

15. The method of claim 14, wherein the electronic device is a mobile communication device.

16. The method of claim 15, wherein detection of the electronic device is performed using a Bluetooth low energy detector disposed within the light assembly.

17. The method of claim 16, further comprising the step:
altering a direction of the light based on the location of the electronic device.

18. The method of claim 17, wherein the light assembly comprises a printed light emitting diode.

* * * * *